United States Patent
Tahara et al.

(10) Patent No.: US 10,807,161 B2
(45) Date of Patent: Oct. 20, 2020

(54) SILVER POWDER, METHOD FOR PRODUCING SAME, AND HYDROPHILIC CONDUCTIVE PASTE

(71) Applicant: DOWA Electronics Materials Co., Ltd., Tokyo (JP)

(72) Inventors: Naoki Tahara, Tokyo (JP); Noriaki Nogami, Tokyo (JP); Hiroshi Kamiga, Tokyo (JP)

(73) Assignee: DOWA Electronics Materials Co., Ltd., Tokyo (JP)

(*) Notice: Subject to any disclaimer, the term of this patent is extended or adjusted under 35 U.S.C. 154(b) by 0 days.

(21) Appl. No.: 16/298,595

(22) Filed: Mar. 11, 2019

(65) Prior Publication Data
US 2019/0247920 A1    Aug. 15, 2019

Related U.S. Application Data

(62) Division of application No. 15/514,879, filed as application No. PCT/JP2015/077212 on Sep. 25, 2015, now Pat. No. 10,272,490.

(30) Foreign Application Priority Data

Sep. 29, 2014 (JP) .................. 2014-198979
Sep. 25, 2015 (JP) .................. 2015-188835

(51) Int. Cl.
*B22F 1/00*    (2006.01)
*C09D 11/30*    (2014.01)
(Continued)

(52) U.S. Cl.
CPC .......... *B22F 1/0074* (2013.01); *B22F 1/0014* (2013.01); *B22F 1/0062* (2013.01);
(Continued)

(58) Field of Classification Search
CPC ........................................ H01B 1/02
See application file for complete search history.

(56) References Cited

U.S. PATENT DOCUMENTS 7,771,625 B2 * 8/2010 Suenaga ............... B22F 1/0062
252/514
2005/0167640 A1    8/2005 Matsushima et al.
(Continued)

FOREIGN PATENT DOCUMENTS

| CN | 101065203 | 10/2007 |
| CN | 101569932 | 11/2009 |

(Continued)

*Primary Examiner* — William D Young
(74) *Attorney, Agent, or Firm* — Carmody Torrance Sandak & Hennessey LLP

(57) ABSTRACT

A silver powder, wherein the silver powder satisfies $D_{50}$-IPA$>D_{50}$-W, where in measurement of a volume-based particle size distribution of the silver powder by a laser diffraction particle size distribution analysis, $D_{50}$-IPA (μm) is a cumulative 50% point of particle diameter of the silver powder when isopropyl alcohol (IPA) is used as a measurement solvent for dispersing the silver powder, and $D_{50}$-W (μm) is a cumulative 50% point of particle diameter of the silver powder when water is used as a measurement solvent for dispersing the silver powder, and wherein a phosphorus content in the silver powder is 0.01% by mass or more but 0.3% by mass or less.

4 Claims, 2 Drawing Sheets

(51) Int. Cl.
    *C09D 7/40*     (2018.01)
    *C08K 9/04*     (2006.01)
    *B22F 9/24*     (2006.01)
    *C09D 5/24*     (2006.01)
    *C09D 11/52*    (2014.01)
    *C09D 101/28*   (2006.01)
    *H01B 1/22*     (2006.01)
    *C08K 3/08*     (2006.01)

(52) U.S. Cl.
    CPC .......... *B22F 9/24* (2013.01); *C08K 9/04* (2013.01); *C09D 5/24* (2013.01); *C09D 7/68* (2018.01); *C09D 11/30* (2013.01); *C09D 11/52* (2013.01); *C09D 101/28* (2013.01); *H01B 1/22* (2013.01); *B22F 2009/245* (2013.01); *B22F 2301/255* (2013.01); *B22F 2302/45* (2013.01); *B22F 2998/10* (2013.01); *C08K 2003/0806* (2013.01); *C08K 2201/001* (2013.01); *C08K 2201/003* (2013.01)

(56) References Cited

U.S. PATENT DOCUMENTS

| 2005/0279970 A1* | 12/2005 | Ogi | B22F 1/0011 252/514 |
|---|---|---|---|
| 2009/0146117 A1 | 6/2009 | Suenaga et al. | |
| 2011/0256383 A1 | 10/2011 | Cochet et al. | |

FOREIGN PATENT DOCUMENTS

| JP | 60-226569 | 11/1985 |
|---|---|---|
| JP | 10-088206 | 4/1998 |
| JP | 10-088207 | 4/1998 |
| JP | 2005-220380 | 8/2005 |
| JP | 2007-177103 | 7/2007 |
| JP | 2007-270334 | 10/2007 |
| JP | 2008-088453 | 4/2008 |
| JP | 2015-092017 | 5/2015 |
| WO | 2006/057348 | 6/2006 |

* cited by examiner

SILVER POWDER, METHOD FOR PRODUCING SAME, AND HYDROPHILIC CONDUCTIVE PASTE

TECHNICAL FIELD

The present invention relates to a silver powder, a method for producing the silver powder, and a hydrophilic conductive paste.

BACKGROUND ART

A conventionally used conductive paste for inner electrodes of laminated condensers, conductive patterns of circuit boards, and electronic parts such as electrodes and circuits of substrates for solar cells and display panels is a conductive paste produced by adding a silver powder to an organic vehicle, followed by kneading. A silver powder for such a conductive paste has been required to have, for example, an appropriately small particle diameter and a uniform particle size in order to respond to, for example, downsizing of electronic parts, and higher densification and finer lines of conductive patterns.

In the case where a highly water-soluble organic solvent or water is used as a solvent for the conductive paste, if a silver powder used for the conductive paste is not compatible to the organic solvent or water, the silver powder becomes in the form of a mass without being dispersed in the conductive paste. As a result, when the conductive paste is coated on, for example, a substrate, a film formed of the conductive paste will be uneven in thickness. This raises a problem with deterioration in conductivity and adhesion strength of the conductor formed by firing the conductive paste.

In order to solve the problem, there is proposed a method including: adding an alkali or a complexing agent to a silver salt-containing aqueous solution to form a silver oxide-containing slurry or a silver complex salt-containing aqueous solution; adding a reducing agent thereto to reduce and deposit silver particles; and adding a dispersing agent to the silver-containing slurry solution, the dispersing agent being a fatty acid, a fatty acid salt, a surfactant, an organic metal, a protective colloid, and at least one kind of a chelate-forming agent selected from a compound having an azole structure, dicarboxylic acid, oxycarboxylic acid, and salts thereof (see, for example, PTLs 1 and 2).

Also, there is proposed a method for producing a silver powder by adding a reducing agent to an aqueous reaction system containing silver ions to reduce and deposit silver particles, wherein two or more kinds of dispersing agents are added to a slurry reaction system before, after, or during reduction and deposition of silver particles, the dispersing agents being preferably, for example, a hydrophobic dispersing agent such as benzotriazole, stearic acid, or oleic acid and a hydrophilic dispersing agent such as gelatin or collagen peptide (see, for example, PTL 3).

In these proposals, however, when a solvent used for the conductive paste has high water solubility, hydrophilicity becomes insufficient depending on the kind of a dispersing agent attached onto the silver powder surface. Thus, compatibility between the silver powder and the solvent may become insufficient, resulting in a problem that the silver powder cannot be dispersed in the conductive paste. Also, depending on the kind of a surfactant and the like added, dispersing effects may be insufficient or absent based on the pH of the reaction solution and the coexisting ions. The kind of the surfactant usable is limited and also it is difficult to strictly control an amount thereof covering the silver powder surface.

In order to solve such problems, there is proposed a method in which after filtrating and water-washing the reduced and deposited silver powder, a phosphate ester-based surfactant is added when a wet cake having a water content of 20% to 80% is crushed in a mixer without being dried, and the resultant is again filtrated and washed with water, followed by drying, to remove the reaction solution and attach the surfactant (see PTL 1).

Also, there is proposed a method in which vacuum freeze drying is performed on a dispersion liquid obtained by dispersing silver particles in a solvent together with an alkylamine-based or alkylamine salt-based surfactant or a phosphate ester-based surfactant having a phosphorus content of 0.5% by mass to 10% by mass, to adsorb the surfactant onto the surfaces of the silver particles, to thereby produce a silver powder surface-treated with the surfactant (see, for example, PTL 4).

These proposed methods can produce a silver powder having a certain degree of hydrophilicity. However, problematically, an additional step is needed in the method for producing a silver powder including adding an alkali or a complexing agent to a silver salt-containing aqueous solution to form a silver oxide-containing slurry or a silver complex-containing aqueous solution, and adding a reducing agent thereto to reduce and deposit silver particles, followed by drying.

CITATION LIST

Patent Literature

PTL 1: Japanese Patent Application Laid-Open (JP-A) No. 10-88207
PTL 2: JP-A No. 2005-220380
PTL 3: JP-A No. 2008-88453
PTL 4: International Publication No. WO2006/057348

SUMMARY OF INVENTION

Technical Problem

The present invention aims to solve the above existing various problems and achieve the following object. Specifically, the present invention has an object to provide a silver powder that has excellent hydrophilicity and is suitable for a conductive paste using a highly water-soluble solvent or water; a method for producing the silver powder; and a hydrophilic conductive paste.

Solution to Problem

The present inventors conducted extensive studies to solve the above problems and as a result have found that a silver powder satisfying $D_{50}$-IPA$>D_{50}$-W has excellent hydrophilicity and is suitable for a conductive paste using a highly water-soluble solvent or water, where in measurement of a volume-based particle size distribution of the silver powder by a laser diffraction particle size distribution analysis, without addition of a surfactant, $D_{50}$-IPA (µm) is a cumulative 50% point of particle diameter of the silver powder when isopropyl alcohol (IPA) is used as a measurement solvent for dispersing the silver powder, and $D_{50}$-W (µm) is a cumulative 50% point of particle diameter of the silver powder when water is used as a measurement solvent for dispersing the silver powder.

The present inventors have also found that a silver powder suitable for a conductive paste using a highly water-soluble solvent or water can be efficiently produced in a method for producing a silver powder including adding a reducing agent to an aqueous reaction system containing silver ions to reduce and deposit silver particles, by adding a phosphorus-containing compound at at least one timing selected from the group consisting of; before reduction and deposition of the silver particles; after reduction and deposition of the silver particles; and during reduction and deposition of the silver particles, a phosphorus content in the phosphorus-containing compound being more than 10% by mass but 30% by mass or less.

The present invention is based on the above findings obtained by the present inventor and means for solving the problems are as follows.

<1> A silver powder,
wherein the silver powder satisfies $D_{50}$-IPA>$D_{50}$-W, where in measurement of a volume-based particle size distribution of the silver powder by a laser diffraction particle size distribution analysis, $D_{50}$-IPA (μm) is a cumulative 50% point of particle diameter of the silver powder when isopropyl alcohol (IPA) is used as a measurement solvent for dispersing the silver powder, and $D_{50}$-W (μm) is a cumulative 50% point of particle diameter of the silver powder when water is used as a measurement solvent for dispersing the silver powder, and
wherein a phosphorus content in the silver powder is 0.01% by mass or more but 0.3% by mass or less.

<2> The silver powder according to <1>, wherein the silver powder contains a phosphorus-containing compound on a surface of the silver powder.

<3> The silver powder according to <2>, wherein the phosphorus-containing compound is phytic acid.

<4> The silver powder according to any one of <1> to <3>, wherein the cumulative 50% point of particle diameter $D_{50}$ of the silver powder is 0.1 μm or more but 5 μm or less and a BET specific surface area of the silver powder is 0.1 $m^2$/g or more but 5 $m^2$/g or less.

<5> A method for producing a silver powder, the method including:
adding a reducing agent to an aqueous reaction system containing silver ions to reduce and deposit silver particles, and
adding a phosphorus-containing compound at at least one timing selected from the group consisting of: before reduction and deposition of the silver particles; during reduction and deposition of the silver particles; and after reduction and deposition of the silver particles, a phosphorus content in the phosphorus-containing compound being more than 10% by mass but 30% by mass or less.

<6> The method for producing a silver powder according to <5>, wherein the phosphorus-containing compound is a phosphate ester of inositol.

<7> The method for producing a silver powder according to <6>, wherein the phosphate ester of inositol is phytic acid.

<8> The method for producing a silver powder according to any one of <5> to <7>, wherein the reducing agent is at least one selected from the group consisting of ascorbic acid, alkanolamine, sodium borohydride, hydroquinone, hydrazine, and formalin.

<9> A silver powder, including: phytic acid on a surface of the silver powder.

<10> A hydrophilic conductive paste, including:
the silver powder according to any one of <1> to <4> and <9>.

<11> A hydrophilic conductive paste, including:
the silver powder according to any one of <1> to <4> and <9>;
a resin; and
a solvent,
wherein the solvent is water.

Advantageous Effects of Invention

The present invention can provide a silver powder that has excellent hydrophilicity and is suitable for a conductive paste using a highly water-soluble solvent or water. Also, the present invention can efficiently produce a silver powder without adding a new step in a method for producing a silver powder including adding a reducing agent to an aqueous reaction system containing silver ions to reduce and deposit silver particles.

DESCRIPTION OF EMBODIMENTS

Silver Powder

Figure 1:
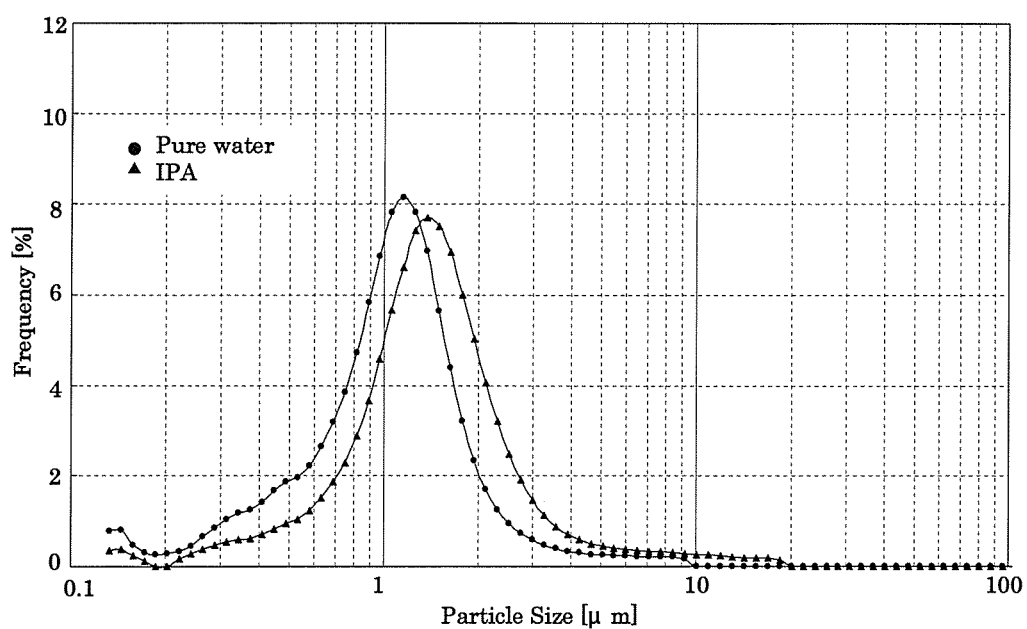
FIG. 1 is a graph presenting measurement results of a particle size distribution of a silver powder of Example 1.

A silver powder of the present invention satisfies $D_{50}$-IPA>$D_{50}$-W, where in measurement of a volume-based particle size distribution of the silver powder by a laser diffraction particle size distribution analysis, $D_{50}$-IPA (μm) is a cumulative 50% point of particle diameter of the silver powder when isopropyl alcohol (IPA) is used as a measurement solvent for dispersing the silver powder, and $D_{50}$-W (μm) is a cumulative 50% point of particle diameter of the silver powder when water is used as a measurement solvent for dispersing the silver powder.

Preferably, the silver powder contains phytic acid on a surface of the silver powder.

The silver powder of the present invention has excellent hydrophilicity and is suitable for a conductive paste using a highly water-soluble solvent or water. Note that, in the measurement of a volume-based particle size distribution of the silver powder by a laser diffraction particle size distribution analysis, a surfactant or the like is not added, and only isopropyl alcohol (IPA) or only water is used as a measurement solvent.

When the silver powder does not satisfy the relationship of $D_{50}$-IPA>$D_{50}$-W, it may not be suitable for a conductive paste using a highly water-soluble solvent or water.

The cumulative 50% point of particle diameter $D_{50}$ is preferably 0.1 μm or more but 5 μm or less, more preferably 0.5 μm or more but 3 μm or less. Note that, the cumulative 50% point of particle diameter $D_{50}$ is a value measured using isopropyl alcohol as a measurement solvent.

When the cumulative 50% point of particle diameter $D_{50}$ is less than 0.1 μm, it is possible to respond to fine line formation. However, the activity of the silver particles is high and the silver powder may not be suitable for a firing-type conductive paste when it is fired at a temperature of 500° C. or higher. Meanwhile, when the cumulative 50% point of particle diameter $D_{50}$ is more than 5 μm, the silver powder becomes poorer in dispersibility and it may be difficult to respond to fine line formation.

The cumulative 50% point of particle diameter $D_{50}$ is measured using a Microtrac particle size distribution analyzer (manufactured by NIKKISO CO., LTD., Microtrac MT3300EXII) by adding 0.1 g of a silver powder sample to 40 mL of a measurement solvent (water or isopropyl alcohol) and dispersing the resultant for 2 minutes with a ultrasonic homogenizer having a chip size of 20 mm.

The obtained measurement results are plotted to create a graph, where cumulation of the particle size distribution of the silver particles is determined.

The cumulative 50% point of particle diameter obtained when the measurement solvent is water is denoted by D50-W, and the cumulative 50% point of particle diameter obtained when the measurement solvent is isopropyl alcohol is denoted by $D_{50}$-IPA.

As described above, the silver powder satisfies $D_{50}$-IPA>$D_{50}$-W and in order to improve hydrophilicity, the silver powder preferably contains a phosphorus-containing compound on a surface of the silver powder.

Here, what is meant by the wording "contains a phosphorus-containing compound on a surface of the silver powder" includes states where the phosphorus-containing compound is attached on the surface of the silver powder in any way such as adsorption and coating. The silver powder may contain the phosphorus-containing compound on at least part of the surface of the silver powder. In other words, the entirety of the surface of the silver powder may contain the phosphorus-containing compound or part of the surface of the silver powder may contain the phosphorus-containing compound. Note that, the silver powder may contain the phosphorus-containing compound in an inner part of the silver powder.

The phosphorus-containing compound is preferably a compound having a phosphorus content of more than 10% by mass but 30% by mass or less, more preferably a compound having a phosphorus content of 20% by mass or more but 30% by mass or less. Examples of the phosphorus-containing compound include polyphosphoric acid, phosphoric acid salt compounds, and phosphate esters.

Examples of the phosphoric acid salt compounds include hypophosphite, orthophosphite, metaphosphite, hypophosphate, orthophosphate, metaphosphate, monoperoxyphosphate, peroxydiphosphate, tripolyphosphate, tetrapolyphosphate, and pyrophosphate.

Examples of the phosphate esters include trialkyiphosphate esters, dialkylphosphate esters, monoalkylphosphate esters, polyphosphate esters, and inositol phosphate esters.

Among them, inositol phosphate esters are preferable. This is because when the phosphorus-containing compound physically or chemically adsorbs onto the silver powder surface, the phosphoric acid group, which can be an adsorption functional group onto the silver powder surface, preferably contains one or two hydroxyl groups.

Examples of the inositol phosphate esters include phytic acid.

The phytic acid is a 6-phosphate ester of inositol (myoinositol hexaphosphate ester) and has a compositional formula of $C_6H_{18}O_{24}P_6$. The phytic acid is expressed by the following structural formula.

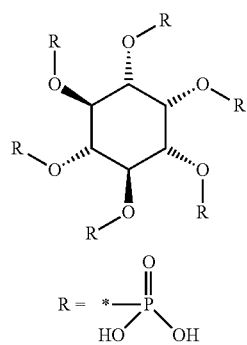

The phytic acid has a phosphorus content of 28.2% by mass in the compound. Its phosphoric acid group has two hydroxyl groups. The phytic acid has a strong chelating action and a high adsorption power on metal surfaces. Thus, it can improve dispersibility of the silver powder.

The silver powder has a phosphorus content in the silver powder of 0.01% by mass or more but 0.3% by mass or less, preferably 0.01% by mass or more but 0.25% by mass or less.

When the phosphorus content is less than 0.01% by mass, the effects to be exhibited may be insufficient. When the phosphorus content is more than 0.3% by mass, an excessive amount of the phosphorus-containing compound becomes free without being adsorbed onto the silver powder, and may adversely affect the properties of the paste.

The phosphorus content in the silver powder can be calculated in the following manner. Specifically, hydrochloric acid is added to the silver powder. The resultant mixture is subjected to a boiling treatment. Then, the resultant is filtrated to remove solid components therefrom. The filtrate is measured for a concentration of phosphorus using an ICP mass analyzer (manufactured by Hitachi High-Tech Science Corporation, SPS-5100). Note that, the phosphorus content in the silver powder in the present invention is a value obtained by measuring phosphorus in components present on the silver powder surface.

The state where the silver powder contains phytic acid on a surface thereof can be confirmed in the following manner, for example. Specifically, the silver powder is extracted with 1% by mass trichloroacetic acid or HCl/MeOH. The resultant solution is measured using an ion chromatograph (manufactured by Dionex Co., DC-500, column: Ionpac AS17-C manufactured by Dionex Co.) to detect a peak representing phytic acid. In this manner, phytic acid on the silver powder surface can be qualitatively analyzed.

A BET specific surface area of the silver powder is preferably 0.1 $m^2$/g or more but 5 $m^2$/g or less, more preferably 0.1 $m^2$/g or more but 2 $m^2$/g or less.

When the BET specific surface area is more than 5 $m^2$/g, the viscosity of the conductive paste is so high that printability and the like become poor. Whereas when the BET specific surface area is less than 0.1 $m^2$/g, the silver particles are so large that it may be difficult to respond to fine line formation.

The BET specific surface area can be measured with, for example, MONOSORB HM-model 1210 (manufactured by MOUNTECH Co.) using a carrier gas of He:70% and $N_2$:30%. Specifically, 3 g of the silver powder is placed in a cell, followed by degassing at 60° C. for 10 minutes, and the resultant is measured by the single point BET method.

The above-described silver powder having excellent hydrophilicity of the present invention can efficiently be produced by a below-described method the present invention for producing a silver powder.

Method for Producing Silver Powder

A method of the present invention for producing a silver powder includes a step of adding a reducing agent to an aqueous reaction system containing silver ions to reduce and deposit silver particles (hereinafter referred to as "silver particles formation step"), and a step of adding a phosphorus-containing compound at at least one timing selected from the group consisting of: before reduction and deposition of the silver particles; during reduction and deposition of the silver particles; and after reduction and deposition of the silver particles, a phosphorus content in the compound being more than 10% by mass but 30% by mass or less (hereinafter referred to as "phosphorus-containing compound addition step"). The method of the present invention further includes other steps, if necessary.

According to the method of the present invention for producing a silver powder, it is possible to efficiently produce a silver powder containing the phosphorus-containing compound on a surface thereof and suitable for a conductive paste using a highly water-soluble solvent or water, without adding a new step in a conventional method including adding a reducing agent to an aqueous reaction system containing silver ions to reduce and deposit silver particles, followed by drying.

The highly water-soluble solvent is not particularly limited and may be appropriately selected depending on the intended purpose. Examples of the highly water-soluble solvent include ketones such as acetone and dimethyl ketone, esters such as ethyl acetate and diethylene glycol ethyl ether acetate, alcohols such as ethanol and isopropyl alcohol, glycols such as ethylene glycol and propylene glycol, and glycol ethers such as ethyl cellosolve and methyl cellosolve.

Silver Particles Formation Step

The silver particles formation step is a step of adding a reducing agent to an aqueous reaction system containing silver ions to reduce and deposit silver particles.

The aqueous reaction system containing silver ions is, for example, an aqueous solution or slurry containing silver nitrate, a silver complex, or a silver intermediate. Among them, an aqueous solution containing a silver complex is preferable.

The aqueous solution containing a silver complex can be prepared by adding aqueous ammonia, ammonium salt, a chelate compound, etc. to an aqueous silver nitrate solution.

The slurry containing a silver intermediate can be prepared by adding sodium hydroxide, sodium chloride, sodium carbonate, etc. to an aqueous silver nitrate solution.

Among them, an ammine complex aqueous solution obtained by adding aqueous ammonia to an aqueous silver nitrate solution is preferable, because the resultant silver powder has an appropriate particle diameter and a spherical shape.

The ammonia in the ammine complex aqueous solution has a coordination number of 2, and thus it is preferable to add 2 mol or more of ammonia per 1 mol of silver. Addition of an excessively large amount of ammonia stabilizes the complex so much that it is difficult for reduction to proceed. Therefore, the amount of ammonia added is preferably 8 mol or less per 1 mol of silver. Note that, some adjustments such as increasing the amount of the reducing agent added could produce a spherical silver powder having an appropriate particle diameter even if the amount of ammonia added is more than 8 mol. Also, a pH adjuster may be added to the aqueous reaction system containing silver ions.

The pH adjuster usable is a commonly-used acid or base. For example, nitric acid or sodium hydroxide may be used.

Examples of the reducing agent include ascorbic acid, sulfites, alkanolamine, aqueous hydrogen peroxide, formic acid, ammonium formate, sodium formate, glyoxal, tartaric acid, sodium hypophosphite, sodium borohydride, hydroquinone, hydrazine, hydrazine compounds, pyrogallol, glucose, gallic acid, formalin, anhydyous sodium sulphite, and Rongalite. These may be used alone or in combination. Among them, because silver particles having an appropriate particle diameter can be obtained, ascorbic acid, alkanolamine, sodium borohydride, hydroquinone, hydrazine, and formalin are preferable, and hydrazine and formalin are particularly preferable.

An amount of the reducing agent added is preferably 1 equivalent or more relative to silver in order to increase the reaction yield of silver. When a reducing agent having weak reducing force is used, the reducing agent is preferably added in an amount of 2 equivalents or more relative to silver, more preferably added in an amount of 10 equivalents or more but 20 equivalents or less relative to silver.

Phosphorus-Containing Compound Addition Step

The phosphorus-containing compound addition step is a step of adding a phosphorus-containing compound at at least one timing selected from the group consisting of: before reduction and deposition of the silver particles; during reduction and deposition of the silver particles; and after reduction and deposition of the silver particles, a phosphorus content in the phosphorus-containing compound being more than 10% by mass but 30% by mass or less.

Note that, other compounds and the like than the phosphorus-containing compound may be added before the addition of the phosphorus-containing compound, so as to be present between the silver powder and the phosphorus-containing compound. Meanwhile, after attaching the phosphorus-containing compound to the silver powder surface, preferably, the other compounds such as fatty acids are not allowed to cover the surface. In other words, when a plurality of dispersing agents are used in the method for producing a silver powder, it is preferable that the phosphorus-containing compound be added last as a dispersing agent.

The phosphorus-containing compound may be appropriately selected from similar phosphorus-containing compounds to those described above in the silver powder, but is preferably an inositol phosphate ester, more preferably phytic acid.

The phosphorus-containing compound may be added at at least one timing selected from the group consisting of: before reduction and deposition of the silver particles; during reduction and deposition of the silver particles; and after reduction and deposition of the silver particles, by adding the phosphorus-containing compound in a wet manner and stirring it.

An amount of the phosphorus-containing compound added is preferably 0.05% by mass or more but 5% by mass or less relative to the silver powder to be charged to the aqueous reaction system. In this range of 0.05% by mass or more but 5% by mass, it is possible to obtain a silver powder suitable for a conductive paste using a highly water-soluble solvent or water.

Other Steps

The other steps are not particularly limited and may be appropriately selected depending on the intended purpose. Examples of the other steps include a washing step of the silver powder and a drying step of the silver powder.

Washing Step of Silver Powder

By filtrating the obtained slurry containing the silver powder and washing it with water, it is possible to obtain a cake containing water in an amount of 1% by mass or more but 200% by mass or less relative to the silver powder and being in the form of a mass with little fluidity.

A method of the filtration is not particularly limited and may be appropriately selected depending on the intended purpose, so long as it is a method used for separation into solid and liquid. Examples of the method include a centrifugal filtration machine, a filter press, and a Buchner funnel. Note that, in order to accelerate drying of the cake obtained by the filtration and prevent aggregation upon drying, water in the cake may be replaced with, for example, a lower alcohol or polyol.

Drying Step of Silver Powder

The drying step of the silver powder is a step of drying the cake obtained in the washing step of the silver powder.

For example, the cake can be dried with a dryer such as a forced circulation air dryer, a vacuum dryer, or an airflow dryer, followed by crushing, to thereby obtain a silver powder.

Instead of the crushing, a surface flattening treatment may be performed. In the surface flattening treatment, the silver particles are charged into an apparatus capable of mechanically fluidizing particles, and the particles are allowed to mechanically crush with each other to flatten irregularities and angular parts on the surface of the silver powder. Also, a classification treatment may be performed after the crushing or the surface flattening treatment. Note that, drying, pulverizing, and classifying can be performed using an integrated apparatus capable of performing drying, pulverizing, and classifying (e.g., DRYMEISTER and MICRON DRYER manufacture by HOSOKAWA MICRON CORPORATION).

According to the method of the present invention for producing a silver powder, it is possible to obtain a silver powder having excellent hydrophilicity and suitable for a conductive paste using a highly water-soluble solvent or water.

The silver powder of the present invention has excellent hydrophilicity and thus can be applied for a conductive paste suitable for inkjet printing by utilizing low-temperature firing in an inert gas or quick drying property. For example, a conductive coated film can suitably be formed by coating or printing it directly on various substrates such as a silicon wafer for a solar cell, a film for a touch panel, and glass for an EL element, or on a transparent conductive film further provided on these substrates if necessary. For example, it is suitably used for a current-collecting electrode of a solar battery cell, an external electrode of a chip-type electronic part, RFID, an electromagnetic wave shield, vibrator adhesion, membrane switch, and electrodes or electrical wiring applications for, for example, electroluminescence.

Hydrophilic Conductive Paste

In the present invention, a hydrophilic conductive paste means a conductive paste that uses a highly water-soluble solvent or water and can contain water in an amount of 1% by mass or more.

A hydrophobic conductive paste can be distinguished from the hydrophilic conductive paste, because water is separated when water is added in an amount of 1% by mass or more.

The hydrophilic conductive paste of the present invention contains a silver powder, a resin, and a solvent. The hydrophilic conductive paste further contains other ingredients, if necessary.

The silver powder used is the silver powder of the present invention. In particular, the silver powder containing phytic acid on a surface thereof is suitably used.

Examples of the solvent include highly water-soluble solvents and water.

The highly water-soluble solvents are not particularly limited and may be appropriately selected depending on the intended purpose. Examples of the highly water-soluble solvent include ketones such as acetone and dimethyl ketone; esters such as ethyl acetate and diethylene glycol ethyl ether acetate; alcohols such as ethanol and isopropyl alcohol, glycols such as ethylene glycol and propylene glycol; and glycol ethers such as ethyl cellosolve and methyl cellosolve. These may be used alone or in combination. The solvent is preferably water.

The resin is not particularly limited and may be appropriately selected depending on the intended purpose. Examples of the resin include phenol resins, urea resins having a methylol group, melamine resins having a methylol group, polyvinyl alcohol, polyethylene oxide, methyl cellulose, carboxymethyl cellulose, hydroxyethyl cellulose, hydroxyethylmethyl cellulose, hydroxypropyl cellulose, acrylic resins, polyacrylamide resins, polyester resins, styrene resins, and maleic acid resins. These may be used alone or in combination.

The other ingredients are not particularly limited and may be appropriately selected depending on the intended purpose. Examples of the other ingredients include surfactants, water-soluble dispersing agents, and dispersion stabilizing agents, each of which can be mixed with water at any ratio.

A method for producing the hydrophilic conductive paste is not particularly limited and may be appropriately selected depending on the intended purpose. For example, the hydrophilic conductive paste can be produced by mixing the silver powder, the resin, the solvent, and the other ingredients contained if necessary, using, for example, an ultrasonic disperser, a disper, a triple roll mill, a ball mill, a bead mill, a biaxial kneader, or a planetary centrifugal stirrer.

The hydrophilic conductive paste can be used for a wider variety of coating objects as compared with hydrophobic conductive pastes that repel water depending on coating objects. Also, the hydrophilic conductive paste can reduce an amount of an organic solvent used and thus can reduce environmental loads. In particular, the hydrophilic conductive paste using water as a solvent rather than an organic solvent as a solvent can greatly reduce environmental loads and necessary facilities upon drying and firing.

EXAMPLES

The present invention will next be described by way of Examples. The present invention, however, should not be construed as being limited to these Examples.

Example 1

3,600 g of a silver nitrate solution containing 52 g of silver was provided. 160 g of a 28% by mass aqueous ammonia solution (manufactured by Junsei Chemical Co., Ltd., special grade) was added to the silver nitrate solution. 95 g of a 20% by mass aqueous sodium hydroxide solution was added thereto, to thereby prepare an aqueous reaction system containing silver ions. The liquid temperature was set to 25° C. 13 g of an 80% by mass aqueous hydrazine solution (manufactured by Otsuka Chemical Co., Ltd.) was added as a reducing agent to the aqueous reaction system containing silver ions, followed by thoroughly stirring, to thereby obtain a slurry containing a silver powder.

0.41 g of a 50% by mass aqueous phytic acid solution (manufactured by Tsuno Food Industrial Co., Ltd., phosphorus content in phytic acid: 28.2% by mass) was added to the obtained slurry containing a silver powder, followed by thoroughly stirring and then aging. The aged slurry was filtrated, washed with water, and crushed, to thereby obtain a silver powder of Example 1.

In the following manner, the obtained silver powder was determined for D50-W and $D_{50}$-IPA, which are cumulative 50% points of particle diameters in measurement of a volume-based particle size distribution by a laser diffraction particle size distribution analysis, and BET specific surface area. As a result, $D_{50}$-W was 1.0 μm and $D_{50}$-IPA was 1.3 μm, indicating that the silver powder satisfied $D_{50}$-W<$D_{50}$-IPA. Also, the BET specific surface area was 1.8 m$^2$/g.

The obtained silver powder was measured for a concentration of phosphorus using an ICP analyzer (manufactured by Hitachi High-Tech Science Corporation, SPS-5100) and the phosphorus content in the silver powder was calculated. As a result, the phosphorus content was 0.03% by mass. These results are presented in Table 2.

Cumulative 50% Point of Particle Diameter ($D_{50}$) by Laser Diffraction Particle Size Distribution Analysis 0.1 g of a silver powder sample was added to 40 mL of water or isopropyl alcohol serving as a measurement solvent, and was dispersed for 2 minutes with a ultrasonic homogenizer having a chip size of 20 mm, followed by measurement using a Microtrac particle size distribution analyzer (manufactured by NIKKISO CO., LTD., Microtrac MT3300EXII).

The obtained measurement results were plotted to create a graph, where cumulation of the particle size distribution of the silver particles was determined. FIG. 1 presents the particle size distributions in both water and isopropyl alcohol in Example 1. The cumulative 50% point of particle diameter obtained when the measurement solvent was water was denoted by $D_{50}$-W, and the cumulative 50% point of particle diameter obtained when the measurement solvent was isopropyl alcohol was denoted by D50-IPA.

Measurement of BET Specific Surface Area

The BET specific surface area was measured with MONOSORB HM-model 1210 (manufactured by MOUNTECH Co.) by the single point BET method using nitrogen adsorption. Note that, in the measurement of the BET specific surface area, degassing conditions before the measurement were 60° C. and 10 minutes.

Example 2

3,600 g of a silver nitrate solution containing 52 g of silver was provided. 160 g of a 28% by mass aqueous ammonia solution (manufactured by Junsei Chemical Co., Ltd., special grade) was added to the silver nitrate solution. 5 g of a 20% by mass aqueous sodium hydroxide solution was added thereto, to thereby prepare an aqueous reaction system containing silver ions. The liquid temperature was set to 28° C. 240 g of a 37% by mass aqueous formalin solution (manufactured by Nippon Kasei Chemical Co., Ltd.) was added as a reducing agent to the aqueous reaction system containing silver ions, followed by thoroughly stirring, to thereby obtain a slurry containing a silver powder.

0.41 g of a 50% by mass aqueous phytic acid solution (manufactured by Tsuno Food Industrial Co., Ltd., phosphorus content in phytic acid: 28.2% by mass) was added to the obtained slurry containing a silver powder, followed by thoroughly stirring and then aging. The aged slurry was filtrated, washed with water, and crushed, to thereby obtain a silver powder of Example 2.

Figure 2:
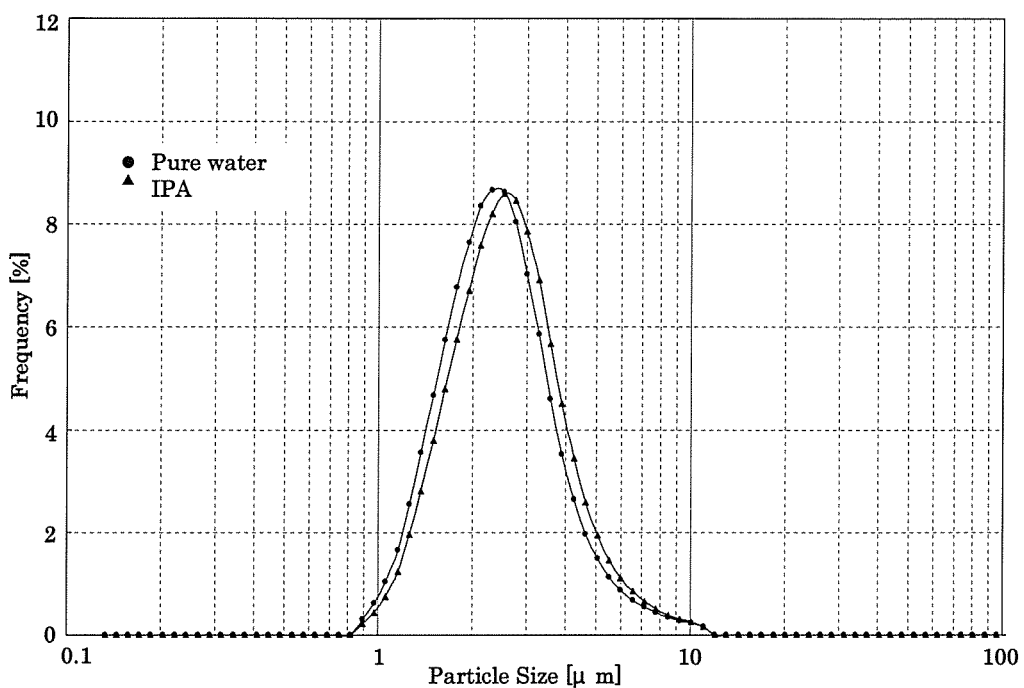
FIG. 2 is a graph presenting measurement results of a particle size distribution of a silver powder of Example 2.

The obtained silver powder was evaluated in the same manner as in Example 1 and the results are presented in FIG. 2. $D_{50}$-W was 2.3 μm and $D_{50}$-IPA was 2.5 μm, indicating that the silver powder satisfied $D_{50}$-W<$D_{50}$-IPA. Also, the BET specific surface area was 0.7 m$^2$/g.

The obtained silver powder was measured in the same manner as in Example 1 for a concentration of phosphorus and the phosphorus content in the silver powder was calculated. As a result, the phosphorus content was 0.014% by mass. These results are presented in Table 2.

Example 3

3,600 g of a silver nitrate solution containing 52 g of silver was provided. 160 g of a 28% by mass aqueous ammonia solution (manufactured by Junsei Chemical Co., Ltd., special grade) was added to the silver nitrate solution. 95 g of a 20% by mass aqueous sodium hydroxide solution was added thereto, to thereby prepare an aqueous reaction system containing silver ions. The liquid temperature was set to 25° C. 1.55 g of a 50% by mass aqueous phytic acid solution (manufactured by Tsuno Food Industrial Co., Ltd., phosphorus content in phytic acid: 28.2% by mass) was added to the aqueous reaction system containing silver ions. Thereafter, 13 g of an 80% by mass aqueous hydrazine solution (manufactured by Otsuka Chemical Co., Ltd.) was added thereto as a reducing agent, followed by thoroughly stirring, to thereby obtain a slurry containing a silver powder.

After thoroughly stirred, the obtained slurry containing a silver powder was aged. The aged slurry was filtrated, washed with water, and crushed, to thereby obtain a silver powder of Example 3.

The obtained silver powder was evaluated in the same manner as in Example 1. As a result, $D_{50}$-W was 0.9 μm and $D_{50}$-IPA was 1.2 μm, indicating that the silver powder satisfied $D_{50}$-W<$D_{50}$-IPA. Also, the BET specific surface area was 4.4 m$^2$/g.

The obtained silver powder was measured in the same manner as in Example 1 for a concentration of phosphorus and the phosphorus content in the silver powder was calculated. As a result, the phosphorus content was 0.24% by mass. These results are presented in Table 2.

Example 4

3,600 g of a silver nitrate solution containing 52 g of silver was provided. 160 g of a 28% by mass aqueous ammonia solution (manufactured by Junsei Chemical Co., Ltd., special grade) was added to the silver nitrate solution. 5 g of a 20% by mass aqueous sodium hydroxide solution was added thereto, to thereby prepare an aqueous reaction system containing silver ions. The liquid temperature was set to 28° C. 0.41 g of a 50% by mass aqueous phytic acid solution (manufactured by Tsuno Food Industrial Co., Ltd., phosphorus content in phytic acid: 28.2% by mass) was added to the aqueous reaction system containing silver ions. Thereafter, 240 g of a 37% by mass aqueous formalin solution (manufactured by Nippon Kasei Chemical Co., Ltd.) was added thereto as a reducing agent, followed by thoroughly stirring, to thereby obtain a slurry containing a silver powder.

After thoroughly stirred, the obtained slurry containing a silver powder was aged. The aged slurry was filtrated, washed with water, and crushed, to thereby obtain a silver powder of Example 4.

The obtained silver powder was evaluated in the same manner as in Example 1. As a result, $D_{50}$-W was 2.0 μm and $D_{50}$-IPA was 2.2 μm, indicating that the silver powder satisfied D50-W <D50-IPA. Also, the BET specific surface area was 1.2 m$^2$/g.

The obtained silver powder was measured in the same manner as in Example 1 for a concentration of phosphorus and the phosphorus content in the silver powder was calculated. As a result, the phosphorus content was 0.10% by mass. These results are presented in Table 2.

Example 5

3,600 g of a silver nitrate solution containing 52 g of silver was provided. 160 g of a 28% by mass aqueous ammonia solution (manufactured by Junsei Chemical Co., Ltd., special grade) was added to the silver nitrate solution. 50 g of a 20% by mass aqueous sodium hydroxide solution was added thereto, to thereby prepare an aqueous reaction system containing silver ions. The liquid temperature was set to 28° C. 1.24 g of a 50% by mass aqueous phytic acid solution (manufactured by Tsuno Food Industrial Co., Ltd., phosphorus content in phytic acid: 28.2% by mass) was added to the aqueous reaction system containing silver ions. Thereafter, 240 g of a 37% by mass aqueous formalin solution (manufactured by Nippon Kasei Chemical Co., Ltd.) was added thereto as a reducing agent, followed by thoroughly stirring, to thereby obtain a slurry containing a silver powder.

After thoroughly stirred, the obtained slurry containing silver was aged. The aged slurry was filtrated, washed with water, and crushed, to thereby obtain a silver powder of Example 5.

The obtained silver powder was evaluated in the same manner as in Example 1. As a result, $D_{50}$-W was 0.8 μm and $D_{50}$-IPA was 1.0 μm, indicating that the silver powder satisfied $D_{50}$-W<$D_{50}$-IPA. Also, the BET specific surface area was 2.5 m$^2$/g.

The obtained silver powder was measured in the same manner as in
Example 1 for a concentration of phosphorus and the phosphorus content in the silver powder was calculated. As a result, the phosphorus content was 0.14% by mass. These results are presented in Table 2.

Comparative Example 1

Silver particles were aged in the same manner as in Example 1, except that the dispersing agent was changed to polyoxyethylene tridecyl ether phosphate ester (PLYSURF A212C, manufactured by DKS Co. Ltd., phosphorus content: less than 5.6% by mass) and the amount of the dispersing agent added was changed to 0.21 g. The aged slurry was filtrated, washed with water, and crushed, to thereby obtain a silver powder of Comparative Example 1.

The obtained silver powder was evaluated in the same manner as in Example 1. As a result, $D_{50}$-W was 4.0 μm and $D_{50}$-IPA was 2.8 μm, indicating D50-W>D50-IPA; i.e., low dispersibility in water. Also, the BET specific surface area was 1.0 m$^2$/g.

The obtained silver powder was measured in the same manner as in Example 1 for a concentration of phosphorus and the phosphorus content in the silver powder was calculated. As a result, the phosphorus content was 0.004% by mass. These results are presented in Table 2.

Comparative Example 2

Silver particles were aged in the same manner as in Example 2, except that the dispersing agent was changed to polyoxyethylene tridecyl ether phosphate ester (PLYSURF A212C, manufactured by DKS Co. Ltd., phosphorus content: less than 5.6% by mass) and the amount of the dispersing agent added was changed to 0.21 g. The aged slurry was filtrated, washed with water, and crushed, to thereby obtain a silver powder of Comparative Example 2.

The obtained silver powder was evaluated in the same manner as in Example 1. As a result, $D_{50}$-W was 8.6 μm and $D_{50}$-IPA was 4.5 μm, indicating D50-W>D50-IPA; i.e., low dispersibility in water. Note that, this silver powder in water generated floating powder on the water surface and precipitates on the bottom, and thus was charged into the measuring device with mixing. Also, the BET specific surface area was 0.3 m$^2$/g.

The obtained silver powder was measured in the same manner as in Example 1 for a concentration of phosphorus and the phosphorus content in the silver powder was calculated. As a result, the phosphorus content was 0.003% by mass. These results are presented in Table 2.

Comparative Example 3

Silver particles were aged in the same manner as in Example 1, except that the dispersing agent was changed to polyphosphoric acid 116% (manufactured by Junsei Chemical Co., Ltd., phosphorus content: 36.2% by mass) and the amount of the dispersing agent added was changed to 0.21 g. The aged slurry was filtrated, washed with water, and crushed, to thereby obtain a silver powder of Comparative Example 3.

The obtained silver powder was evaluated in the same manner as in Example 1. As a result, $D_{50}$-W was 4.2 μm and $D_{50}$-IPA was 3.5 μm, indicating $D_{50}$-W>$D_{50}$-IPA; i.e., low dispersibility in water. Also, the BET specific surface area was 1.4 m$^2$/g.

The obtained silver powder was measured in the same manner as in Example 1 for a concentration of phosphorus and the phosphorus content in the silver powder was calculated. As a result, the phosphorus content was 0.031% by mass. These results are presented in Table 2.

Comparative Example 4

Silver particles were aged in the same manner as in Example 1, except that the dispersing agent was changed to gelatin (manufactured by JELLICE Co. Ltd., E-200) and the amount of the dispersing agent added was changed to 0.21 g. The aged slurry was filtrated, washed with water, and crushed, to thereby obtain a silver powder of Comparative Example 4.

The obtained silver powder was evaluated in the same manner as in Example 1. As a result, $D_{50}$-W was 1.7 μm and $D_{50}$-IPA was 1.6 μm, indicating D50-W>D50-IPA; i.e., low dispersibility in water. Also, the BET specific surface area was 1.5 m$^2$/g.

The obtained silver powder was measured in the same manner as in Example 1 for a concentration of phosphorus but no phosphorus was detected in the silver powder. These results are presented in Table 2.

Comparative Example 5

Silver particles were aged in the same manner as in Example 1, except that no dispersing agent was added. The aged slurry was filtrated, washed with water, and crushed, to thereby obtain a silver powder of Comparative Example 5.

The obtained silver powder was evaluated in the same manner as in Example 1. As a result, $D_{50}$-W was 7.8 μm and $D_{50}$-IPA was 7.7 μm, indicating D50-W>$D_{50}$-IPA; i.e., low dispersibility in water. Also, the BET specific surface area was 1.0 m$^2$/g.

The obtained silver powder was measured in the same manner as in Example 1 for a concentration of phosphorus but no phosphorus was detected in the silver powder. These results are presented in Table 2.

Comparative Example 6

Silver particles were aged in the same manner as in Example 2, except that no dispersing agent was added. The aged slurry was filtrated, washed with water, and crushed, to thereby obtain a silver powder of Comparative Example 6.

The obtained silver powder was evaluated in the same manner as in Example 1. As a result, $D_{50}$-W was 8.9 μm and $D_{50}$-IPA was 6.1 μm, indicating D50-W>D50-IPA; i.e., low dispersibility in water. Note that, this silver powder in water generated floating powder on the water surface and precipitates on the bottom, and thus was charged into the measuring device with mixing. Also, the BET specific surface area was 0.3 m$^2$/g.

The obtained silver powder was measured in the same manner as in Example 1 for a concentration of phosphorus but no phosphorus was detected in the silver powder. These results are presented in Table 2.

TABLE 1

| | | Dispersing agent | | |
|---|---|---|---|---|
| | Reducing agent | Name | Phosphorus content (% by mass) | Amount added (g) |
| Ex. 1 | Hydrazine | 50% by mass aqueous phytic acid solution | 28.2 | 0.41 |
| Ex. 2 | Formalin | 50% by mass aqueous phytic acid solution | 28.2 | 0.41 |

TABLE 1-continued

| | | Dispersing agent | | |
|---|---|---|---|---|
| | Reducing agent | Name | Phosphorus content (% by mass) | Amount added (g) |
| Ex. 3 | Hydrazine | 50% by mass aqueous phytic acid solution | 28.2 | 1.55 |
| Ex. 4 | Formalin | 50% by mass aqueous phytic acid solution | 28.2 | 0.41 |
| Ex. 5 | Formalin | 50% by mass aqueous phytic acid solution | 28.2 | 1.24 |
| Comp. Ex. 1 | Hydrazine | PLYSURF A212C | <5.6 | 0.21 |
| Comp. Ex. 2 | Formalin | PLYSURF A212C | <5.6 | 0.21 |
| Comp. Ex. 3 | Hydrazine | Polyphosphoric acid 116% | 36.2 | 0.21 |
| Comp. Ex. 4 | Hydrazine | Gelatin E-200 | — | 0.21 |
| Comp. Ex. 5 | Hydrazine | — | — | — |
| Comp. Ex. 6 | Formalin | — | — | — |

TABLE 2

| | $D_{50}$-W (μm) | $D_{50}$-IPA (μm) | BET specific surface area (m$^2$/g) | Phosphorus content in silver powder (% by mass) |
|---|---|---|---|---|
| Ex. 1 | 1.0 | 1.3 | 1.8 | 0.03 |
| Ex. 2 | 2.3 | 2.5 | 0.7 | 0.014 |
| Ex. 3 | 0.9 | 1.2 | 4.4 | 0.24 |
| Ex. 4 | 2.0 | 2.2 | 1.2 | 0.10 |
| Ex. 5 | 0.8 | 1.0 | 2.5 | 0.14 |
| Comp. Ex. 1 | 4.0 | 2.8 | 1.0 | 0.004 |
| Comp. Ex. 2 | 8.6 | 4.5 | 0.3 | 0.003 |
| Comp. Ex. 3 | 4.2 | 3.5 | 1.4 | 0.031 |
| Comp. Ex. 4 | 1.7 | 1.6 | 1.5 | — |
| Comp. Ex. 5 | 7.8 | 7.7 | 1.0 | — |
| Comp. Ex. 6 | 8.9 | 6.1 | 0.3 | — |

Example 6

The silver powder obtained in Example 2 was confirmed that the silver powder contained phytic acid on at least a surface thereof, by a method using an ion chromatograph (manufactured by Dionex Co., DC-500, column: Ionpac AS17-C manufactured by Dionex Co.). 0.01 g of the silver powder obtained in Example 2, 1.6 g of a resin (manufactured by NISSIN-KASEI CO., LTD., CELLOSIZEQP-09L), and 18.4 g of ion-exchanged water were weighed with an electronic balance, followed by stirring for 1 minute using a metal spatula. Thereafter, a homogenizer was used to perform dispersion for 5 minutes, to thereby obtain a dispersion liquid.

Next, 20 g of the obtained dispersion liquid was charged to a 20 mL test tube, and left to stand still for 24 hours. As a result, no separation was observed, and the dispersed state was maintained.

Next, the silver powder obtained in Example 2 (90% by mass), a resin (manufactured by Wako Pure Chemical Industries, Ltd., ethyl cellulose) (0.8% by mass), and a solvent (butyl carbitol acetate (BCA) manufactured by Wako Pure Chemical Industries, Ltd.) (9.2% by mass) were mixed (preliminarily mixed) with a planetary centrifugal stirrer and bubble remover (manufactured by THINKY Corporation, Awatori Rentaro), followed by kneading with a triple roll mill (manufactured by OTTO HERRMANN, INC., EXAKT80S), to thereby obtain hydrophobic conductive paste 1.

Next, the silver powder obtained in Example 2 (90% by mass), a resin (manufactured by NISSIN-KASEI CO., LTD., CELLOSIZEQP-09L) (0.8% by mass), and an ion-exchanged water (9.2% by mass) were formed into a paste in the same manner as described above, to thereby obtain hydrophilic conductive paste 1.

Next, a 1-inch substrate of 96% alumina was provided. The hydrophobic conductive paste 1 and the hydrophilic conductive paste 1 were printed on a surface of the alumina substrate with a screen printing machine (manufactured by Microteck Inc., MT-320T) to form an electrode shape having a width of 500 μm and a length of 37,500 μm. The resultant was dried with a hot-air dryer at 150° C. for 10 minutes and was fired at a peak temperature of 850° C. in a firing IR kiln (manufactured by NGK INSULATORS, LTD., a four-chamber kiln of high-speed firing).

Next, a terminal was put on the electrode to measure a resistance value using Digital Multimeter R6551 (manufactured by Advantest Corporation). A surface roughness measuring instrument (manufactured by Kosaka Laboratory Ltd., SE-30D) was used to measure a film thickness. The obtained resistance value and the film thickness were used to determine a volume resistivity from the following formula.

Volume resistivity (Ωcm)=resistance value (Ω)×film thickness (μm)×500 (μm)×0.0001÷37500 (μm)

The obtained resistance value, film thickness, and volume resistivity are presented in Table 3.

Comparative Example 7

Silver particles were aged in the same manner as in Example 2, except that stearic acid (manufactured by Wako Pure Chemical Industries, Ltd., special grade reagent) was used as a surface-treating agent and the amount thereof was changed to 0.21 g.

Next, the aged slurry was filtrated, washed with water, and crushed, to thereby obtain a silver powder of Comparative Example 7.

The obtained silver powder was evaluated in the same manner as in Example 1. As a result, $D_{50}$-W was 8.6 μm and $D_{50}$-IPA was 4.5 μm, indicating $D_{50}$-W>$D_{50}$-IPA; i.e., low dispersibility in water. Note that, this silver powder in water generated floating powder on the water surface and precipitates on the bottom, and thus was charged into the measuring device with mixing. Also, the BET specific surface area was 0.3 m²/g.

Using the same method as in Example 6, 0.01 g of the obtained silver powder was attempted to be dispersed in 1.6 g of a resin (manufactured by NISSIN-KASEI CO., LTD., CELLOSIZEQP-09L) and 18.4 g of ion-exchanged water. However, the silver powder repelled the ion-exchanged water, and a dispersion liquid could not be obtained.

Next, using the same method as in Example 6, the obtained silver powder (90% by mass), a resin (manufactured by Wako Pure Chemical Industries, Ltd., ethyl cellulose) (0.8% by mass), and a solvent (manufactured by Wako Pure Chemical Industries, Ltd., butyl carbitol acetate (BCA)) (9.2% by mass) were formed into a paste, to thereby obtain hydrophobic conductive paste 2.

Meanwhile, the obtained silver powder (90% by mass), a resin (manufactured by NISSIN-KASEI CO., LTD., CELLOSIZEQP-09L) (0.8% by mass), and ion-exchanged water (9.2% by mass) were attempted to be formed into a paste in the same manner as described above. However, the silver powder repelled the ion-exchanged water and was not formed into a paste, and a hydrophilic conductive paste could not be obtained.

Next, using the same method as in Example 6, the resistance value, film thickness, and volume resistivity of the hydrophobic conductive paste 2 were determined. The results are presented in Table 3.

TABLE 3

| | Surface-treating agent | Resin | Solvent | Formation into paste | Resistance value (Ω) | Film thickness (μm) | Volume resistivity (Ω · cm) |
|---|---|---|---|---|---|---|---|
| Ex. 6 | Phytic acid | Ethyl cellulose | BCA | Formed into paste | 0.128 | 22 | 3.8E−06 |
| | | CELLOSIZEQP-09L | Ion-exchanged water | Formed into paste | 0.107 | 24 | 3.4E−06 |
| Comp. Ex. 7 | Stearic acid | Ethyl cellulose | BCA | Formed into paste | 0.142 | 17 | 3.3E−06 |
| | | CELLOSIZEQP-09L | Ion-exchanged water | Not formed into paste | — | — | — |

The results of Table 3 indicate that use of phytic acid as a surface-treating agent could form a hydrophilic conductive paste capable of using water as a solvent, and its volume resistivity is lower than that of the hydrophobic conductive paste using the same silver powder of Example 6 and is equivalent to that of the hydrophobic conductive paste of Comparative Example 7. It has been found from this that a hydrophilic conductive paste having low environmental loads and low volume resistance value can be obtained.

Industrial Applicability

The silver powder of the present invention has excellent hydrophilicity and can use a highly water-soluble solvent or water as a solvent of a conductive paste. Thus, for example, this silver powder can be applied for a conductive paste suitable for, for example, inkjet printing by utilizing low-temperature firing in an inert gas or quick drying property.

The hydrophilic conductive paste of the present invention is suitably used for, for example, a current-collecting electrode of a solar battery cell, an external electrode of a chip-type electronic part, RFID, an electromagnetic wave shield, vibrator adhesion, membrane switch, and electrodes or electrical wiring applications for, for example, electroluminescence.

The invention claimed is:

1. A method for producing a silver powder, the method comprising:
adding a reducing agent to an aqueous reaction system containing silver ions to reduce and deposit silver particles, and adding a phosphorus-containing compound at least one timing selected from the group consisting of: before reduction and deposition of the silver particles; during reduction and deposition of the silver particles; and after reduction and deposition of the silver particles, a phosphorus content in the phosphorus-containing compound being 20% by mass or more but 30% by mass or less.

2. The method for producing a silver powder according to claim 1, wherein the phosphorus-containing compound is a phosphate ester of inositol.

3. The method for producing a silver powder according to claim 2, wherein the phosphate ester of inositol is phytic acid.

4. The method for producing a silver powder according to claim 1, wherein the reducing agent is at least one selected from the group consisting of ascorbic acid, alkanolamine, sodium borohydride, hydroquinone, hydrazine, and formalin.

* * * * *